United States Patent
Grossman-Avraham

(10) Patent No.: US 12,425,427 B2
(45) Date of Patent: Sep. 23, 2025

(54) METHOD AND SYSTEM FOR ONLINE USER SECURITY INFORMATION EVENT MANAGEMENT

(71) Applicant: CELESTYA LTD., Tefen Tower Industrial Area (IL)

(72) Inventor: Limor Grossman-Avraham, Moshav Hosen (IL)

(73) Assignee: CELESTYA LTD., Tefen Tower Industrial Area (IL)

( * ) Notice: Subject to any disclaimer, the term of this patent is extended or adjusted under 35 U.S.C. 154(b) by 132 days.

(21) Appl. No.: 17/891,794

(22) Filed: Aug. 19, 2022

(65) Prior Publication Data
US 2022/0394052 A1    Dec. 8, 2022

Related U.S. Application Data

(63) Continuation-in-part of application No. PCT/IB2021/051474, filed on Feb. 22, 2021.

(60) Provisional application No. 62/978,852, filed on Feb. 20, 2020.

(51) Int. Cl.
| | |
|---|---|
| H04L 9/40 | (2022.01) |
| G06F 11/34 | (2006.01) |
| G06F 21/50 | (2013.01) |
| G06F 21/55 | (2013.01) |
| G06F 21/57 | (2013.01) |

(52) U.S. Cl.
CPC ...... H04L 63/1425 (2013.01); H04L 63/1416 (2013.01); H04L 63/20 (2013.01)

(58) Field of Classification Search
CPC . H04L 63/1425; H04L 63/1416; H04L 63/20; H04L 63/1433; H04L 63/1491; G06F 21/50; G06F 21/552; G06F 21/577; G06F 11/3438
See application file for complete search history.

(56) References Cited

U.S. PATENT DOCUMENTS

| | | | |
|---|---|---|---|
| 2014/0310235 A1 | 10/2014 | Chan et al. | |
| 2018/0357563 A1* | 12/2018 | Kurian | .......... G06N 20/00 |
| 2018/0375886 A1 | 12/2018 | Kirti et al. | |
| 2019/0260764 A1 | 8/2019 | Humphrey et al. | |

(Continued)

OTHER PUBLICATIONS

Bitton, Ron et al. "Taxonomy of mobile users' security awareness"; Computers & Security, Elsevier Science Publishers.; vol. 73, Nov. 8, 2017, pp. 266-293; 28 pages. https://doi.org/10.1016/j.cose.2017.10.015.

(Continued)

*Primary Examiner* — Vu V Tran

(74) *Attorney, Agent, or Firm* — The Roy Gross Law Firm, LLC; Roy D. Gross

(57) ABSTRACT

A method for providing an automated response to user behavior comprising: receiving, by a computer system, data of user actions taken on a computer of the user, the computer of the user in communication with the computer system; analyzing the received data against the knowledge level of the user as determined by the computer system, and/or, the user's responses to simulations generated by the computer system, to determine a score for the user; and, in response to the score, making a behavior recommendation for the user and/or making a decision to take an action associated with the computer of the user.

14 Claims, 5 Drawing Sheets

(56) References Cited

U.S. PATENT DOCUMENTS

| | | | |
|---|---|---|---|
| 2019/0356679 A1* | 11/2019 | Sites ................... | H04L 63/1416 |
| 2020/0021620 A1* | 1/2020 | Puratheppambil ........................ | |
| | | | H04L 63/102 |
| 2020/0112590 A1* | 4/2020 | Bhatia ................. | H04L 63/1441 |
| 2020/0128047 A1* | 4/2020 | Biswas ................... | H04L 67/10 |

OTHER PUBLICATIONS

PCT Search Report for International Application No. PCT/IB2021/051474, filed Jun. 11, 2021, 2 pp.
PCT Written Opinion for International Application No. PCT/IB2021/051474, filed Jun. 11, 2021, 4 pp.

* cited by examiner

METHOD AND SYSTEM FOR ONLINE USER SECURITY INFORMATION EVENT MANAGEMENT

RELATED APPLICATIONS

The present application is a Continuation in part of PCT Patent Application No. PCT/IB2021/051474, having International filing date of Feb. 22, 2021, which claims the benefit of priority under 35 U.S.C. 119(e) of U.S. Provisional Application 62/978,852 filed on Feb. 20, 2020, the disclosure of which is incorporated herein by reference.

TECHNICAL FIELD

The present invention is directed to managing the behavior of users of computers, and in particular, to behavior management of computer users along an enterprise network.

BACKGROUND

Cyber-attacks can cripple an organization, costing it heavy losses in soft costs such as down time and lost production, as well as hard costs, where the business is not running and not producing revenues. In a business or enterprise, almost all employees, agents and contractors have access to the enterprise network, as well as access to large public and wide area networks, such as the Internet. It is through any one of these network connections that a cyber-attack can enter the enterprise network.

SUMMARY

The present disclosure realizes that various users of computers, who link to the enterprise network, have different computer-related habits, behaviors and practices. Some users constantly surf the net, and of these users, many may surf to dangerous sites, such as pornography, dating, hacking, gambling, and social media web sites, that are rife with malware for causing cyber-attacks. Also, some users are not conscientious about opening emails and accordingly, open emails from unknown senders, another way a cyber-attack can enter an enterprise network. Additionally, while the enterprise may have set policies as to computer usage, some users may simply not follow the policy, partially follow the policy, or simply attempt to bypass the policy, without understanding or being aware of the dangers of not following the policy. In addition, some employees do not know how to create an appropriate password according to corporate policies or they may not be aware of the full password policy at all. For example, users may not be aware where is it allowed to store passwords, which of the employees in the organization may share a personal password etc.

To determine a computer user's level of risk, behavior and awareness, the present invention collects, records and analyzes events from different sources such as Active Directory/Domain Controller, SIEM (Security Information and Event Management) systems, cybersecurity awareness training systems etc., an agent at the user computer (including an API for collecting events from other systems), in order to monitor user behavior on the user's end-device (computer, telephone, tablet and the likes), analyze the user behavior, identify security threats and respond accordingly. The response is guided according to predetermined company policies containing rules how to respond to different events. Such user behavior may include dangerous behavior events which may expose the computer/company data/servers or network to cyberattacks and malware, jeopardizing security of the entire enterprise network and the machines linked thereto. The agent may be, for example, a browser add-on, a service or any other computerized component, which links to a central computer associated with the enterprise network. The same analysis for a single user may also be performed at department, sector, or company level.

Such agent sits at endpoints, user computers, along the network, for example, a local or enterprise network. The agent (or any other service) collects data related to security events from the user's computer (or smart phone or tablet or any other user device) and automatically ranks the user's behavior and risk level. Users can also initiate a report manually through the same agent, regarding a suspicious event/website etc. they encountered. When the same report is collected from several users (on a suspicious event/website/email, and the like), the suspicious event/website/email may be blocked or filtered or sent for verification. All collected security information affects the score and rating of the user according to actual behavior (in view of security threats) plus practical behavior in simulations, plus the user's theoretical knowledge or user knowledge level, having been presented tutorials. It is also possible to know the reliability of the reports in relation to the score and rating of the user's awareness, knowledge and work habits in comparison with the organizational policies.

The system of the invention collects information including security events about the user's actual behavior on his end-device, user awareness, user knowledge, simulations and ranking of the user, and if there is an abnormal operation/action on the computer (end point). The system then processes the information and events collected against the rules defined in the company security policy rules. An organization's security policy rules comprise: (1) a plurality of rules, each rule defining the conditions for a security violation; and (2) appropriate action to be taken for a user violating the rule (action may be tailored depending on user profile). If the conditions of a rule are met, then the actions associated with that rule are executed. For example, the system may suddenly detect an abnormal increase in internet activity for a given user, an activity that is not in line with user's history, ratings and permission. The system may then execute the action associated with the security rule violated, for example, disconnect the user end-device from the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION OF THE DRAWINGS

Figure 1:
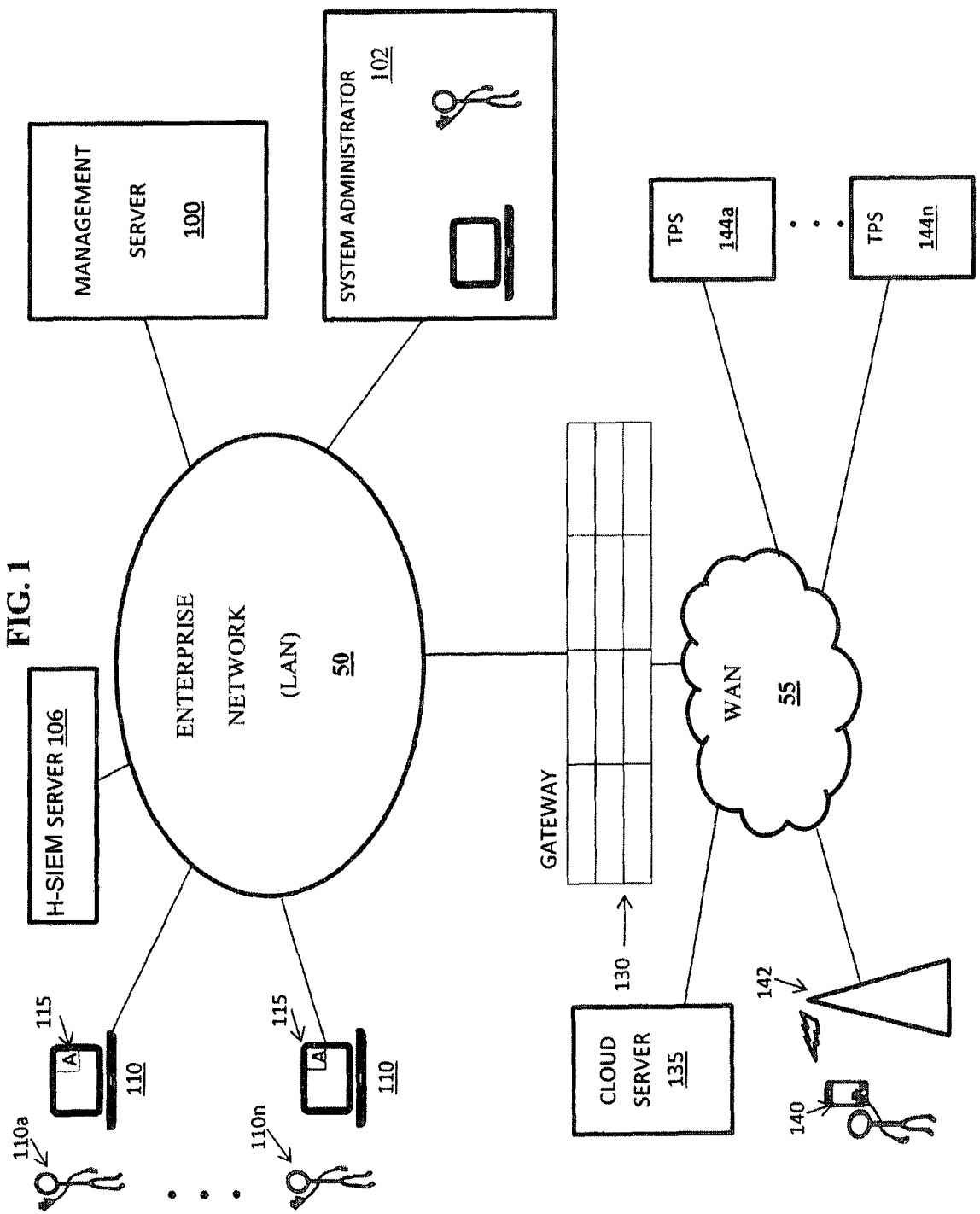
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

In one aspect, the present invention relates to a computing system comprising at least one processor; and at least one memory communicatively coupled to the at least one processor comprising computer-readable instructions that when executed by the at least one processor cause the computing system to implement a method of predicting a security risk by a user, the method comprising:

receiving by the system a plurality of security policy rules, each rule defining conditions for a security violation and appropriate action to be taken for a user violating the rule;

receiving by the system a plurality of security events, each event comprising user profile data (that may include user name, ID, user job function, user end-device and more) and event-related data;

applying one or more machine learning methodologies for analyzing the security events and building a model of user profiles with an associated risk probability for violating a security policy rule;

receiving a user profile and a security policy rule and based on the model determining a risk probability that the user will violate the security policy rule; and if the probability is above a predetermined value (threshold), recommending taking preventive action with the user. The preventive action can be one or more of actions such as preventive user training, sending a warning to the user, alerting the user's manager, and activating preventive security tools (changing user access privileges, installing additional safety tools, tightening security filters etc.), all in order to reduce the security risk associated with the security policy rule.

The analysis of the risk probability of a user profile violating a security policy rule based on the model, can also be done for a category of users. For example, the model may find that users in a certain job function that don't have a college degree and are above 55, have a 35% risk (above threshold value of 10) of falling victim to an SMS phishing message.

In some embodiments, a software agent is provided to the computer of the user for obtaining the user actions taken on the computer of the user and transmitting data of the user actions to the computer system for analysis.

The system may initiate simulations (similar to hacking attacks), to the user to test his response and attitude, and determine the user's compliance with the organization's security policy. Such simulations can include cyber-attacks, phishing, SMS phishing, voice phishing, Wi-Fi phishing, media devices hacking, email handling, document handling, file handling, and web browsing.

The system issues and maintains for each user one or more security scores that are updated based on the user profile, history of security compliance, and successful trainings results.

In another aspect, the present invention relates to computing system comprising: at least one processor; and at least one memory communicatively coupled to the at least one processor comprising computer-readable instructions that when executed by the at least one processor cause the computing system to implement a method of responding to a security risk by user in an organization, the method comprising:

receiving by the system a plurality of security policy rules, each rule defining the conditions for a security violation and appropriate action to be taken for a user violating the rule;

receiving by the system from a computerized security agent surveying the user's actions, a security event associated with a user in the organization; and verifying if the security event violates a security policy rule, and if so, applying the action associated with the security policy rule towards the user, the associated comprising one or more of: changing the user's access privileges in the organization's system, adjusting the user security score, and mandating the use to undertake instructional measures to strengthen the user's knowledge of the security rules.

In some embodiments, a security event is based on user actions during a simulation presented to him by the system. The system may initiate simulations of hacking attacks in order to test the user's compliance with the security policies of the organization. Such simulations generated by the system can include one or more of: cyber-attacks, phishing, SMS phishing, voice phishing, Wi-Fi phishing, media devices hacking, email handling, document handling, file handling, and web browsing.

The system generates and maintains for each user one or more security scores based on his profile, history of security compliance, and successful trainings results. These security rules are dynamically updated based on the user's performance and compliance.

In some embodiments, the preventive action associated with the user further comprises preventive user training, sending a warning to the user, alerting the user's manager, and activating preventive security tools, in order to reduce the security risk associated with said security policy rule.

A security event may also be reported by one or more of: Security Information and Event Management (SIEM) server, Active Directory (AD) or through an application programming interface (API) on the network.

FIG. 1 shows an example environment in which the invention is performed. An enterprise network, which is a local area network (LAN) 50, is representative of a network of an organization, for explaining the invention. A management server 100, which supports some or all of the system 100', which performs the invention, links to the LAN 50. A system server 102 (representative of a system administrator), also links to the LAN 50. The management server 100, for example, operates automatically, while the system server 102, for example, is operated by personnel associated with the enterprise.

A Human Security Information and Event Management (H-SIEM or Human SIEM) server 106 links to the LAN 50. The H-SEIM server 106 collects data on activity in the LAN 50, which is traceable to users (endpoints), for example, user computers, represented by computer 110, and is used for determining a score (also known as a behavior score for example, for trustworthiness/security risk)) for each user (at each endpoint). This H-SIEM server 106 is optional, as the data collected thereby may be collected by alternate hardware and software, or combinations thereof.

The H-SIEM server 106, if present on the enterprise network 50, is a type of SIEM server (a security analytics tool), which, for example, receives and collects reports in a single location. The H-SEIM server 106, for example, collects big data about the user 110*a*, in terms of computer behavior, knowledge of the user, and the like.

A user computer 110 associated with a user 110*a* is representative of multiple users associated with their computers of the enterprise, which are linked to the LAN 50, with each of these computer(s) 110 being representative of endpoints of the LAN 50. An agent (A) 115 of sits on the user computer 110, and maps to the management server 100, or any other enterprise determined destination. The agent 115 sends the data which it detects, to the management server 100, where the data is collected and analyzed in accordance with the processes detailed herein. The agent 115 may be a hardware component, software, or a combination of hardware and software.

While a traditional desktop computer 110 is shown as the endpoint computer, other suitable endpoint computers include, for example, laptop computers, smart phones, iPads®, and other equipment. Both the LAN 50 and WAN 55 include components, such as firewalls 130, switches, routers, network access controllers (not shown), which can be controlled, by the system 100', for example, automatically, and/or system administrator 102, to control the endpoints and endpoint computers 110, devices and the like.

However, should the computer 110, e.g., desktop computer, laptop computers, smart phones, iPad® computers, and other equipment lack access to the WAN 50, a cloud server 135 may be employed. The cloud server 135, to the which the desktop computer, laptop computers, smart phones, iPads®, and other equipment will report, and from the server settings, for example, will send recommendations to the management server 100, and optionally, the system administrator 102. Additionally, there is, for example, a default preset configuration that the system administrator 102 can edit/delete/add, desktop computers, laptop computers, smart phones, iPads®, and other equipment. The cloud server 135 is formed of hardware components, software, or combinations thereof.

Additionally, the cloud server 135 relays and shares information that is trusted with servers in other organizations. This information can be accessed or automatically transmitted to the management server 100 and/or the system administrator 102. The management server 100, for example, can automatically take action based on information received from the cloud server 135, for example, making a behavior recommendation, and/or taking an action against the user computer, as detailed below. The system administrator 102 can also take action, similar to that of the management server 100, based on the information received from the cloud server 135.

For example, the cloud server 135: 1) can collect reports from customers, such as enterprises, and send recommendations to the customers, which may be passed onto computer users 110*a* of the enterprise; 2) can send warnings to end user equipment, such as user computers 110; 3) provides solutions for equipment not on the enterprise network 50; and, 4) can update customer servers, such as the management server 100, and, the system administrator server 102, as to the presence of threats, for example, suspicious or malicious websites to block, some of these web sites which may even be benign. Additionally, the cloud server 135 can collect data about the users 110*a*-110*n* and their computers 110 of the enterprise, while these users are not online. The collected data may be, for example, part of reports, received by the system 100', and, as a result of one or more reports being received, the management server 100 may automatically issuing a behavioral recommendation to the user or taking action on the associated user computer 110.

For example, when an offline user wants to surf the Internet while he is not inside the enterprise (corporate or corporate internal) network 50, a request is sent through the cloud server 135, to the management server 100, to open the Internet (WAN) 55 for browsing, or alternately, open a wireless network on the computer 110, for example, a laptop computer, tablet (iPad®), or the like, through the agent 115. Subsequently, automatically and according to a preset configuration on the management server 100, if, for example, the user's cyber awareness (trustworthiness/risk) score, also known as a behavior score or a score, is high, and the user has also passed a safe surfing tutorial, the management server 100 will send an instruction (command) for action, through the cloud server 135, that the user can surf the Internet. However, if the user's score is low, and the user did not complete the tutorial, then the user will first have to attend a tutorial and only then, will the user be able to surf the Internet. The aforementioned occurs, for example, when the user 110 is not within the enterprise (corporate internal) network.

The agent 115 is configured to monitor and detect the behavior of a user 110*a* (also known as "user behavior" with respect to the computer 110 and the LAN 50, as the computer 110 serves as an endpoint. The agent 115 monitors the computer 110 for example, for actual computer behavior of the user, email behavior, web browsing behavior (the "actual computer behavior", "email behavior" and "web browsing behavior" collectively referred to herein as "actual computer behavior"), file downloads, threat and website (e.g., URL) reporting, and, devices used in conjunction with the computer, and communicates this actual behavior (e.g., as raw data), records thereof, and/or data associated therewith, to the management server 100. The agent 115 is such that the user 110*a* can report to the management server 100 and/or the system server 102, or the agent 115 itself can automatically report to the management server 100 and/or the system server 102, unusual user computer events such as, slowdowns of computer workflow, changes of file types/extensions, browser direction to suspicious websites (which may actually be benign), infrequent user behavior, user behavior at times when the user is not normally on the computer 110, a user who rarely or never browses to malicious or unauthorized web sites is suddenly browsing to such sites regularly, and the like, regardless of whether the websites are malicious, suspicious, or benign. The agent 115 can also report unusual user computer behavior to the management server 100 and/or the system server 102, such as user browsing to web sites for which the user lacks permissions, credentials or the like, and, web sites for which the user lacks permissions, credentials or the like, and continues to attempt to access these web sites.

Email behavior monitored and detectable by the agent 115, and transmitted to the management server 100, for example as actual actions (e.g., raw data), data and/or records, includes, for example, which emails are opened, the time after receipt when the emails are opened, the sources of the emails being opened, any attachments being opened from the emails being opened, any known viruses and/or malware in the attachments being opened, attempts to open emails which have been blocked, quarantined, or otherwise disabled, emails being sent including the recipients, and any attachments being included therein, receiving an alert or antivirus or other block when attempting to open an attachment and continuing to attempt to open the attachment.

Web browsing (surfing) behavior being monitored by the agent 115 includes, for example, the type of web sites to which the browser is directed, such as pornography sites, gambling sites, social media sites, cites which violate the enterprise policy, known to be rife with viruses and/or malware, as well as interactions with various web sites, including data transmissions, file uploads and downloads, and openings of the downloaded files, as well as files and downloads of applications from the Internet, e.g., Skype®, and opening the applications. Additionally, web browsing behavior may include, for example, monitoring the time of the web browsing, and/or the certain web sites (Uniform Resource Locators (URLs)), being viewed at certain times or time periods.

For example, should the user 110a, via computer 110 attempt to direct his web browser to a particular website (regardless of the email link, but standard web browsing), and the website is blocked by a technology protection solution (e.g., URL filtering), then this information is also collected by the agent 115 and/or by the Company SIEM provider/SIEM solution or any other cyber security awareness solutions. This information is used to influence user (employee) awareness rankings, based on actual and practical behavior, and one or the other of, the user's simulations behavior and the theoretical level of knowledge (user knowledge level) from the answers the user provided to his tutorials. As a result of this data collection and analysis by the management server 100 from the data obtained by the agent 115, the system 100' defines the level of reliability of user reports in relation to the rating of the level of awareness, knowledge and work habits and actual behavior of the user 110a and in comparison, with the organizational policy. Sample rule: an employee tries to access a forbidden site (forbidden according to company policies) 3 times. It does not matter whether the access was successful or blocked. If the terms of the rule are met, then the action associated with the rule is automatically executed by the system. For example, the rule and action may specify that after the third security event, Internet access will be blocked for that user until the user completes a given tutorial. The action may also specify that a report is sent to the user's manager, and the user's security rating is reduced by 10 points.

As another example, the system administrator 102 can configure the system 100', such that over a predetermined number of unsuccessful attempts to access a file, email, email attachment or the like, or browsing to an unauthorized web site for a predetermined number of times, make a predetermined number of attempts to use an unauthorized device on the computer 110, such as an unapproved disk on key, or other unapproved portable storage device, or commit another system policy violation for a predetermined number of times, the user 110a-110n will be blocked automatically from accessing the network 50, for example, by the management server 100 automatically taking action, and/or will need to request permission from the help desk center (e.g., system administrator 102 operated) and/or automatically report to authorized personnel, to be again provided access to the network 50. A user who attempts more than the predetermined number of tries to perform a prohibited action, including actions prohibited by system policies, then one (or more) of actions, to limit the user's access and usage of the network 50 will automatically occur, for example, as automatically directed by the management server 100 taking action and/or in accordance with defaults or settings that the system administrator 102 has set.

As another example, a user may be asking the management server 100 to open a web site, allow use of an external device on his computer, or other permission, such as a temporary permission. Should the user 110a have a high score for trustworthiness/low security risk, the management server 100 automatically takes the action on the computer 110 and/or the network 50, to provide the user 110a with the requested permission. However, should the user score be low, the management server 100, may automatically deny the request, or send the request to the system server 102, where the system administrator will decide as to granting of the permission.

Devices being monitored for by the agent 115 also include, for example, portable storage devices, portable drives, disk on key, and other Universal Serial Bus (USB) devices, WIFI™ devices, Bluetooth™ devices, which connect to the computer via physical (e.g., wired) connections, such as ports, or are linked wirelessly.

The agent 115 is, for example, a browser add-on, and operates with the existing web browsers, of the computer 110 and the computer's 110 operating system. The agent 115 is also designed to allow users to report security breaches, their own and those of others, suspicious files, suspicious and malicious web sites and devices, which may be known to contain malware, viruses, and other threats, and the like, which are in turn, transmitted to the management server 100 for data collection and analysis. As a browser add-on, the agent 115 can filter or otherwise block access to web sites as well as report browsing of these disallowed web sites. Also, the agent 115 may be such that the user may be allowed to access this web site for a limited time. The agent 115 can work with browsing programs (browsers), such as Internet Explorer™ from Microsoft, or Chrome™ from Google.

Another example of an external response action: the employee is added to a group ("Member of" tab) on the company's Active Directory, while other security systems in the organization determine the permissions and restrictions for that group, and in fact by adding the employee to the group (an action performed by the system automatically as stated as a result of the event that the employee performed)—the user's permissions in the organization are altered as a result. The management server 100 interacts or otherwise communicates with the agent 115, for example, such that the agent 115 acts as a go between with the management server 100. For example, through the agent 115, the user may make a report to the management server 100; the agent may be used to send instructions to the user at the user computer; from the management server 100 and/or the system server 102, the management server 100 and/or the system server 102 can send instructions to the user at the user computer 110, through the agent 115; and, the agent 115 can send reports to the management server 100 and/or the system server 102.

The agent 115 also includes a push-button feature, which detects a web site and/or web page, and responds by displaying a push button, which is activated by a mouse click, swipe, contact or the like. When the button is activated, data for the web site/web page is sent to the management server 100, for example, as a request. The management server 100, automatically attends to the request, returning an answer, whether the site is suspicious or not, and whether the user 110a is permitted to enter personal data, play videos or download files from the site, or the like. Should an automatic answer not be provided in a predetermined time, the management server then sends the request to a system administrator 102, who provides a manual response.

The agent 115 also allows the user 110a-110n, via the computer 110, to communicate with the system 100' and report suspicious or malicious web pages (URLs), attachments, files, viruses and the like. For example, this may result in the system 100' taking automatic and immediate action, as detailed below, such as blocking the user 110a computer's 110 access to the LAN 50.

A gateway 130, such as a firewall or other inspection or security device, sits between the LAN 50, and a wide area network (WAN) 55 or public network, such as the Internet. An Internet caller device 140 links to the WAN 55 via a cellular tower 142. Third party servers (TPS) 144a-144n also link to the WAN 55. For example, one or more of the third party servers 144a-114, looks for malicious, suspicious or threatening web sites and other network threats, and sends updates to customers, such as the management server 100 and/or the system server 102.

The networks LAN 50 and WAN 55, although shown as single networks, may be a combination of networks and/or multiple networks including, for example, data networks, cellular networks, communications networks, and the like. "Linked" as used herein, includes both wired and/or wireless links, either direct or indirect, such that the computers, including, servers, components and the like, are in electronic and/or data communications with each other.

Figure 2:
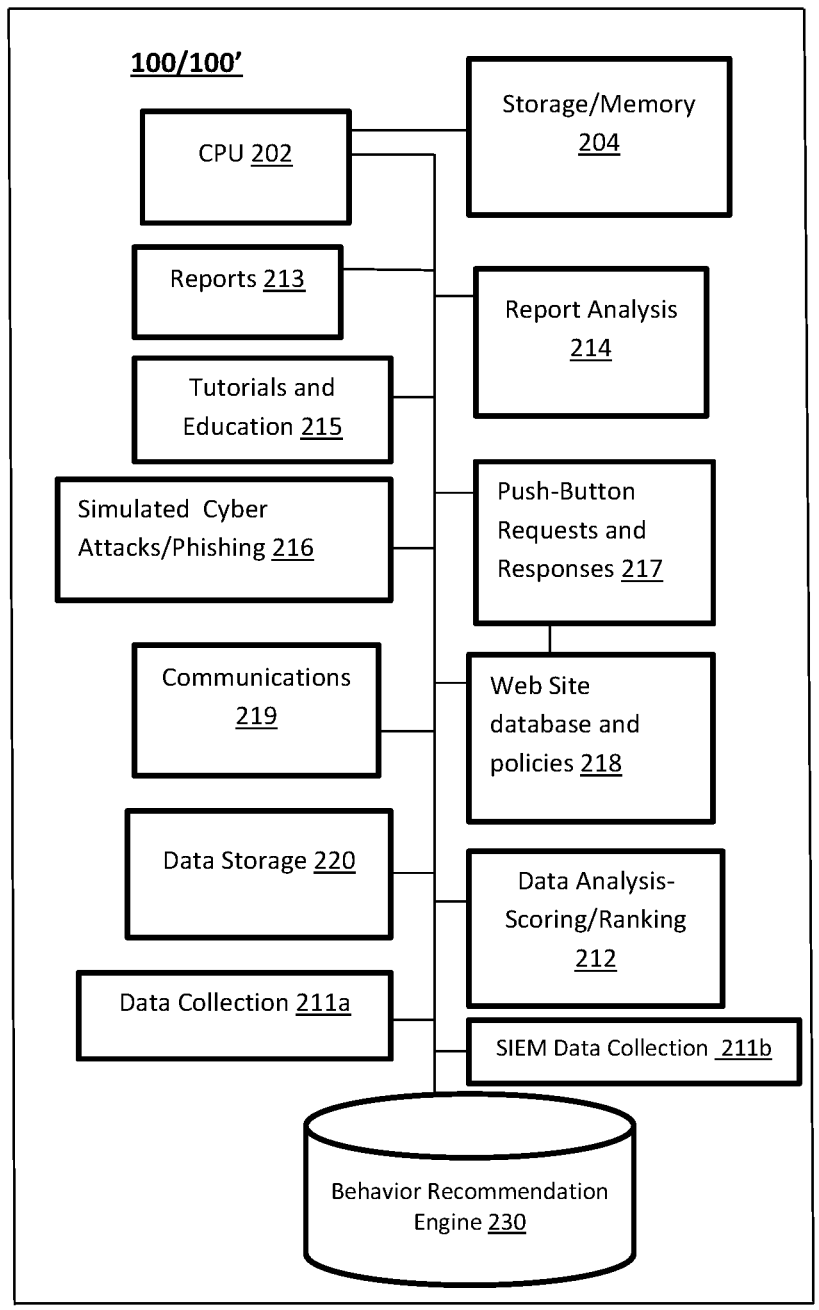
FIG. 2 is a block diagram of an architecture of a system in of the disclosed subject matter.

FIG. 2 shows an example architecture of the management server 100, as a system 100'. The system 100', also known as a computer system, is shown, for example, within the management server 100, but may be distributed external to the management server 100, for example, among multiple servers, computers, components and the like along the LAN 50 and/or the WAN 55. The management server 100, for example, is formed of hardware components, software, or combinations thereof.

The architecture of the system 100', for example, includes a central processing unit (CPU) 202 formed of one or more processors. The CPU 202 is electronically linked, and in electronic and/or data communication, directly or indirectly with computer components including: a storage/memory 204, a data collection module or data collector 211a, a HUMAN SIEM data collection module or HUMAN SIEM data collector 211b, a data analysis module or data analyzer 212, a reports module 213, a report analysis module 214, a tutorials and education module 215, a simulated cyber-attacks/phishing module 216, a push-button requests and responses module 217, a web site data bases and policies module 218, a communications interface 219, data storage media 220, and a behavior recommendation engine 230. While components 202, 204, 211a-220, and 230 of the system 100' are shown within the management server 100, any one or more of these components 202, 204, 211a-220, and 230 may be external to the management server 100, and be linked to the management server 100 from their external location. As used herein, a "module", for example, includes a component for storing instructions (e.g., machine readable instructions) for performing one or more processes, and including or associated with processors, e.g., the CPU 202, for executing the instructions. While the aforementioned components are shown for the system 100', other components may also be used.

The Central Processing Unit (CPU) 202 is formed of one or more processors, including microprocessors, for performing the management server 100 functions and operations detailed herein, including controlling the components 204 and 211a-220 and 230, executing the instructions provided and/or obtained therefrom. The Central Processing Unit (CPU) 202 processors are, for example, conventional processors, such as those used in servers, computers, and other computerized devices, including data processors and hardware processors, for performing the management server 100 and system 100' functions and operations detailed herein. For example, the processors may include x86 Processors from Advanced Microdevices (AMD) and Intel, Xenon® and Pentium® processors from Intel, as well as any combinations thereof.

The storage/memory 204 is associated with the CPU 202, and is any conventional storage media. The storage/memory 204 also includes machine executable instructions associated with the operation of the CPU 202 and the components 211a-220 and 230, and along with the processes and sub-processes shown in FIG. 3, detailed herein. The storage/memory 204 also, for example, stores rules and policies, such as security policies, for the system 100' and the management server 100.

The data collection module or data collector 211a collects data received from the agent 115 on each computer or other endpoint of the LAN 50, as well as from the company SIEM product/supplier, from the Active directory (also known as Domain controller), as well as the Human SIEM server 106, and cloud servers, represented by the cloud server 135.

The Human SIEM data collection module or Human SIEM data collector 211b collects Human SEIM data and events on the system 100', when the LAN 50 does not have a Human SIEM Server. Security event data may also be collected from AD, SIEM solution, security agent or via an API on the network.

The data analysis module 212 analyzes data including the collected data from data collectors 211a, 211b, and the agent 115, including, for example, actual computer behavior, email behavior, and web browsing behavior, coupled with reports (produced by the reports module 213) on the user, the user's position, the user having been educated by tutorials as to cyber security policies of the organization, the user's responses to simulated cyber-attacks, simulated phishing, as provided by the system 100', and actual computer behavior, and the like, the sensitivity of data the user has attempted to obtain, and the like. The analyzed data is then converted to a score for the user, which reflects the trustworthiness and/or risk associated with this user. For example, the score may change each time user behavior (and user data obtained therefrom), is again detected. The score also serves as a ranking/rating of the user, when compared to other users in the organization for risk and trustworthiness of the user. The score may be the basis for a report or provided in a report along with other computer behavioral data reported for or by the user. For example, the score may be based on a set time period, or aggregated over time. When determining the score, one or more of the user data, such as the various behavior actions, reports, and other factors used to determine the score may be given various weights, for example, depending on importance, relevance, and the like. Also, for example, a "high" score may be for a more trustworthy and low risk user, while a "low" score may be for a less trustworthy and high-risk user, the parameters for the score are, for example, programmed into the module 212 (FIG. 2). In addition, a score may also be produced for a department/position/sector/age range/seniority or any other segmentations.

The score created by the data analysis module 212 is, for example, based on one or more factors. A first factor is theoretical behavior/theoretical knowledge or user knowledge level, based on tutorials and quizzes other tests, and webinars (network-based education) sent to the user at his computer, provided to the user. The second factor is practical or practical behavior, such as user performance in simulations, such as simulated phishing attacks, simulated cyber-attacks and the like. The third factor is the actual behavior of the user, how the user interacts and behaves on a daily or regular basis with actual interactions and situations. Additional factors may include, for example, reports, such as those made by the user, as to malicious, suspicious, as well as potentially malicious and suspicious, web sites, emails, downloads, and the like. For example, should a report made by a user be accurate, this may positively influence the user's score. The user's score may also be influenced based on events collected on the user/department/role/sector.

For example, monitored and detected user 110*a* behavior includes detecting a user 110*a* continuing to browse a web site, which is against the enterprise's security policy. While the enterprise may not actually block this web site, as it may not have the means to do so, or there is a technology, such as a URL (uniform resource locator) filtering engine so that the user is blocked when browsing in contravention of enterprise policy and the server still records the browsing attempts in violation of policy—this is actual behavior, that will affect the score given to this user. Also affecting the score is the system knowing the user 110*a* has been warned about browsing certain web sites, which are against company policy, but continues to do so, which is part of his actual behavior factored into his score.

The data analysis module 212 also performs comparison functions. For example, the data collected from data collector 211*a*, 211*b* is analyzed by comparing it against system 100'/enterprise rules and policies, e.g., in the module 218. The results of this comparison are used in determining the score, for example, as part of the user's actual behavior.

The reports module 213 creates reports on user activity on their computers, and stores the reports created. Reports made for the enterprise, for or any computer 110 (or other endpoint) along the enterprise network 50, regardless of the time when made, are stored in the reports module 213. Reports are made by users, as well as about users, by third parties, and the like. Reports may be consolidated with other reports into a single report. The activity reported, which makes up a report, includes, for example, user actions on the computer, as well as indications of the user having received various tutorials and education about computer security (theoretical knowledge/behavior or user knowledge level), and their behavior when faced with simulated cyber-attacks, phishing attempts, and other malicious and potentially malicious situations (practical knowledge/behavior), and, the user's actual behavior when using his computer—how the user interacts and behaves on a daily basis (actual knowledge/behavior), such as what web sites (browser directions to URLs) are viewed, what time is the computer normally used, and what web sites are viewed at what times, does the user attach any external devices such as external drives, disk on keys, and the like, to the computer, does the user report certain web sites, or others viewing certain web sites, at what time and with what frequency, does the user request permission to browse web sites against company policy and when, does the user request exceptions to company computer policies, does the user continue to attempt to open unopenable files, such as email attachments, or files not permitted to be opened by company policies, such as certain file types, or other files from external sources, such as from web sites, portable storage devices, and the like, which are against company policy, or failing to take protective action against external files (e.g., virus scanning and/or reporting these files as suspicious), downloads made and downloads attempted, and the like. The reports module 213 is typically provided with the user's score, from module 212, and factors this score into the report on the user. The reports can be also generated for a department/sector/country/employee seniority/employee age/senior management/geographic location, etc., both in terms of data analysis and in terms of scores. The report analysis module 214 provides analysis for each report created, as well as received from users, such as this website is suspicious. For example, should a user with a low score report a web site as suspicious, the system 100' may not render a decision on the web site, and instead, pass the data on to the system administrator 102, who makes the decision on the web site. However, should a user with a high score report a web site as suspicious, or there are a minimum number of users who report a particular website as a suspect, the system 100' (e.g., via a command issued by the engine 230) may take action against users attempting to direct their browsers to this web site, as it is now "suspicious" in the system 100', or to send a prompt for action to the enterprise URL filtering technological solution. For example, user reports, the frequency the user makes reports and the accuracy of the report, influence the user's score, and are factored into the calculation thereof.

The Tutorials and Education module 215 stores various media, such as tutorials and educational programs for the users 110 of the system, which they can access or be sent. The tutorials and educational programs are, for example, used to explain company policies as well as explain damage which can occur to computers, networks, and machines on a network, should a policy be breached and/or a virus or the like enter the enterprise network. The tutorials and educational programs may also include quizzes and the like on computer security, company policies and the like, for the user to understand and answer, to gauge the user's awareness of these topics. The tutorials, education, and quizzes may also be presented as network-based training, such as in webinars, live and recorded.

The simulated cyber-attack/phishing module 216 stores simulated cyber-attacks and simulated phishing attempts, such as email phishing, SMS (short message service) phishing (smishing), web phishing, Wi-Fi® phishing, cellular application phishing, media device phishing and voice phishing (vishing), which are presented to users 110 via their computers (and/or mobile devices), for example, either as programmed into the system 100' or via the system administrator 102. The results of the user's 110*a*-110*n* handling of these simulations, for example, user actions as part of user behavior, are collected, for example, by the agent 115 and ultimately by the data collection module 211*a*.

The push-button requests and responses module 217 operates on web site access requests from users, including sending the request for a manual decision from the system administrator 102. This module 217 records the decisions on the web site access, both made automatically by the module 217, and manually.

The web site database and policies module 218 stores rules and policies and information about web sites, emails, file types, downloads, and the like, so that automatic decisions can be made about allowing a computer 110 access to the web site, email, file type, download, or the like, or whether the decision as to access to the web site, email, file type, download, or the like must be sent to the system server 102, to made manually.

The communications interface 219 provides for communications between the system 100' and computers, components and the like, which are linked to the LAN 50, and/or the WAN 55.

The storage media 220 provides storage, both temporary and permanent, for data collected and created by the system 100'.

The behavior recommendation engine 230 is a processor based computer component which analyzes all of the user data (also known as user computer data) including behavior data (e.g., obtained as data elements (or data portions) from the user's theoretical knowledge or user knowledge level, practical knowledge, and actual knowledge) from the user's behavior on his computer 110, and/or other user data, email behavior and web browsing behavior, obtained as data elements (data portions) including one or more of, scores, risk ratings, company (enterprise) rules and policies, and reports for and/or from a user at any given time. The user data and behavior data, for example, is on the order of hundreds or thousands of data elements (or parameters) which are analyzed by the behavior recommendation engine 230. The analysis is, for example, such that different data elements may have different weights, as designated and provided for by weighting algorithms. The analysis of these hundreds or thousands of data elements is performed, for example, contemporaneously, and may be performed simultaneously, and accordingly is a "big data" analysis, that is performed by special purpose computers. The "big data" analysis, for example, includes analyzing and systematically extracting information, or otherwise dealing with data sets that are too large or complex to be dealt with by traditional data-processing application software and/or software tools, for example, by specialized computer hardware and/or software, to capture, curate, manage, and process data within a tolerable elapsed time, for example, on the order of seconds, and, for example, in real time.

From this user data and analysis, the behavior recommendation engine 230, performs one or more of recommending action for influencing user behavior, and/or taking or initiating the taking of action against a user computer for mitigating user behavior. For example, the taking action is performed to mitigate against threats, malware and other damaging agents to the individual user computer 110 as well as the enterprise network (LAN), and the computers linked thereto.

Recommendations may include, for example, whether the user should be warned about his computer behavior, and directed to, or sent, for example, automatically by the management server 100, media, such as tutorials and education, webinar (e.g., Zoom™-https//zoom.us) as provided by module 215 and/or a third-party server 114a-114n. For example, after reporting and learning the user's behavior, the engine 230 provides recommendations regarding teaching methods, recommendations for practice and/or blockages, and appropriate technology/network permissions (email/browsing/password selection/file access and the like). The recommendations may also include not providing any recommendations, or waiting to do so at a later time. For example, waiting to issue behavior recommendations at a later time may be based on further monitoring of user behavior to determine whether such behavior has improved to a level deemed satisfactory in accordance with system rules and policies.

The taking action against the user computer includes, for example, directing the system 100' to block access to web sites, disable certain components of the computer, deny the user access to the company network and/or the internet, not allow the user computer to work with any external components, such as external drives and disk on key, and the like. The taking action may also include not taking any action or waiting to do so at a later time. The taking action may refer to performing external response actions, for example, in Active directory: adding an employee to groups, imposing time limits for this "member of" group member action/defining an active employee as inactive (enable-disable)/moving an employee from one Organization Unit (OU) to a different OU/setting an obligation for the employee to change his password at his next network login/reporting the event and the employee to the personal manager/email alert to employee and manager before performing an action for example before disabling the user.

The behavioral recommendation engine 230 can recommend and direct the system 100' or components thereof, such as firewalls (e.g., gateway 130), switches, routers, network access controllers in the LAN 50 or WAN 55 to perform actions automatically. The automatic actions are performed, for example, according to one or more of: reports, employee awareness rank and reliability, employee (user) scores (e.g., risk scores), according to presets or defaults in the system 100' regarding the number of users reported (Employee Notification Website). Automatic actions performed may also include, blocking browsing to suspicious sites from the one or more user computers 110 linked to the network 50, and, reporting to servers of information security solutions and propulsion technology solutions for operations, including, for example, automatic reporting to an enterprise Uniform Resource Locator (URL) filtering server (not shown) about the site to be blocked/reporting an antivirus/mail filtering server, and the like. The automatic actions also include turning off or deactivating network components such as firewalls, switches, routers, network access controllers in the LAN 50 or WAN 55.

The recommendations to take action, and actual actions, may also be, for example, from a list of actions. These actions result in commands sent by the engine 230 to the agent 115, as well as network peripheral components, such as computers (e.g., end points), firewalls, network access controllers in the LAN, switches, routers, other LAN components, and cyber security technology solutions. The commands may be performed (issued) automatically by the management server 100, or by the system administrator 102, who can take action, including issuing commands, manually.

The behavioral recommendation engine 230 can also cause reporting of an event and/or actionable recommendation to all users or users via an outbreak message (using Microsoft'S™ PSEXEC tool (or any other similar tool) or at the user's login time or via email. For example, an outbreak message to employees about a suspicious URL for a website which is a phishing site, or a URL of website that is currently infected and prohibited from browsing until further notice. The behavioral recommendation engine 230 can also cause reporting of an event and/or an actionable recommendation to the system administrator 102 or similar official, via an outbreak message or via email.

Additional functionalities of the behavioral recommendation engine 230 include causing the system 100' to automatically report to user (employee) personal managers, automatically report to user (employee) personal files, provide automatic feedback, both positive or negative, and repeat notifications to users (employees) by reporting a site or suspicious event, for example, whether the site is safe to continue browsing or suspicious. Also the engine 230 can recommend causing automatic blocking of certain web sites for certain users and/or certain computers, as well as automatically blocking a predetermined number of computers 110 at the same time, based on, for example, IP address, domain, usernames, computer names, and the like.

Still other additional functionalities of the engine 230 include rendering recommendations which cause the system 100' to automatically disconnect the computer from the network 50 if the computer 50 is suspected of being compromised, and/or the attacker will propagate across the network 50 according to a set of settings. For example, this is done automatically by commanding a switch to block certain ports or all ports or internal firewall blocking (internal signaling). Also, an automatic block of access to an external device, can be caused by a recommendation from the engine 230. Actions may also include external actions using Active Directory or SIEM or any API that executes an action on an external resource.

The engine 230 can also make recommendations, which will cause automatic authorization for a user who submits a request through the agent 115 to open a site for a predefined and limited time (with/without the option to extend time), for example, a predetermined time, e.g., on the order of minutes or hours, or predefined Universal Serial Bus (USB) access for a user who requested access to the network 50.

Figure 3A:
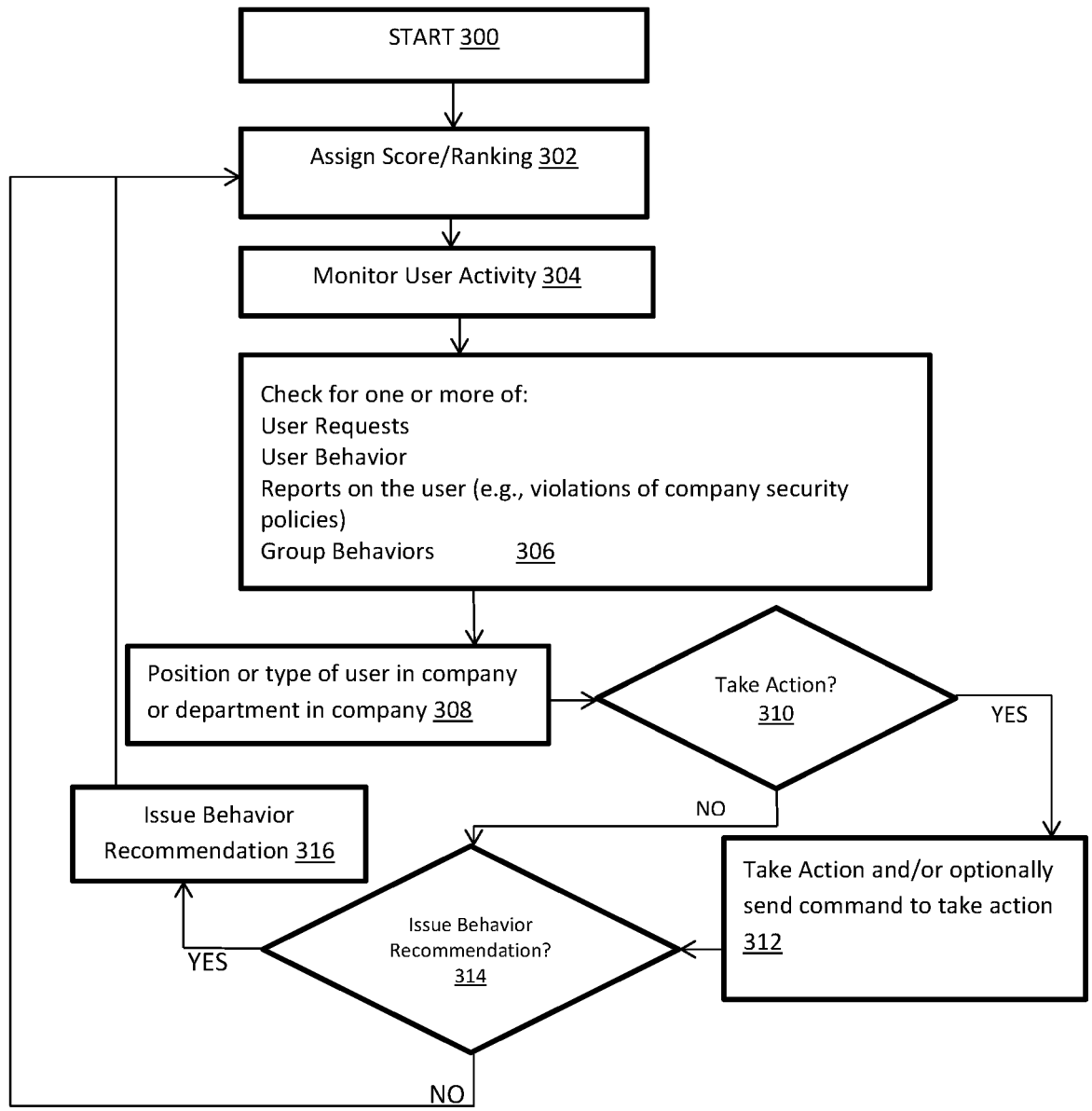
FIG. 3A is a flow diagram of an example process of the disclosed subject matter.
Figure 3B:
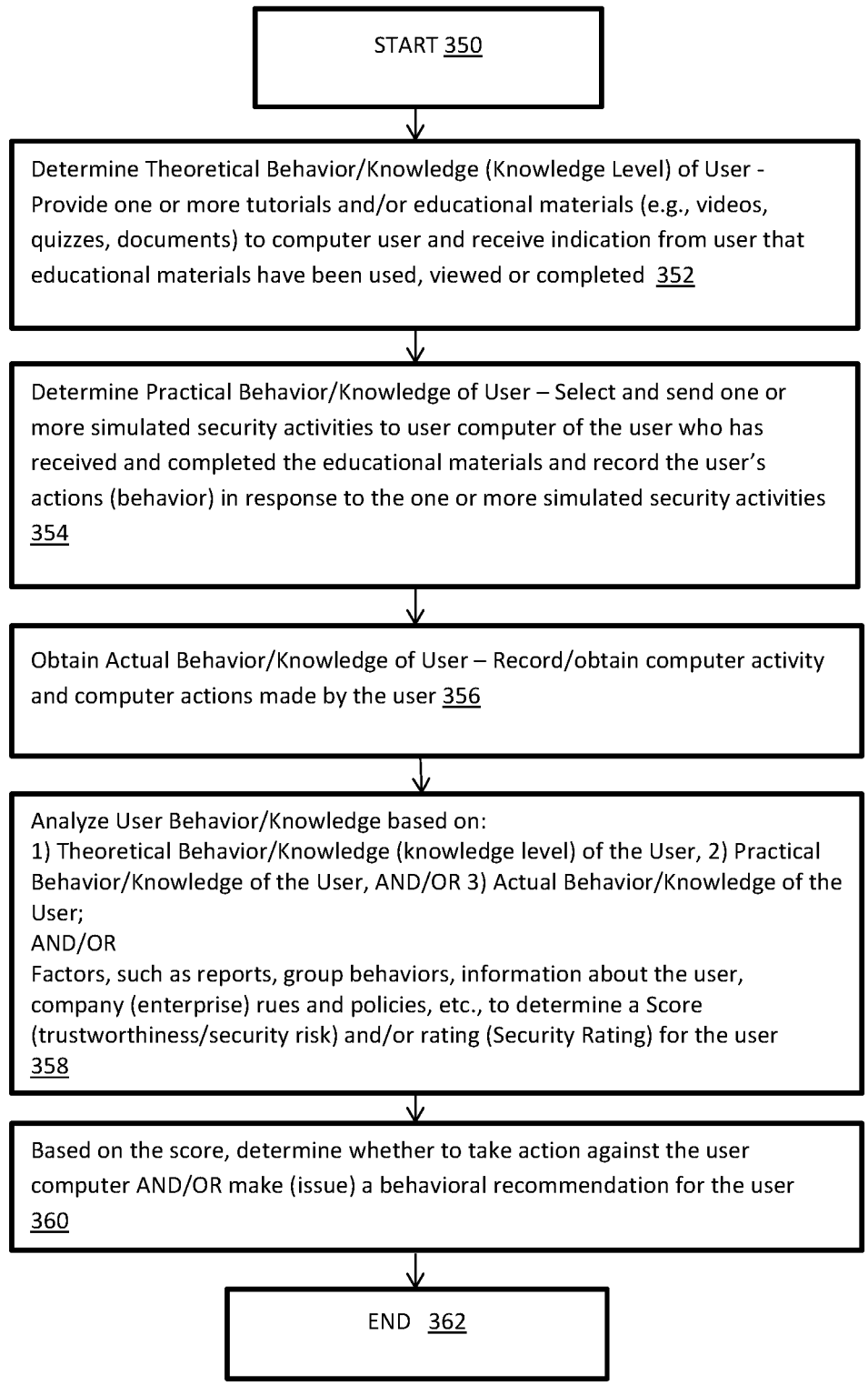
FIG. 3B is a flow diagram in accordance with another example process of the disclosed subject matter; and, FIG. 3C is a flow diagram in accordance with another example process of the disclosed subject matter.
Figure 3C:
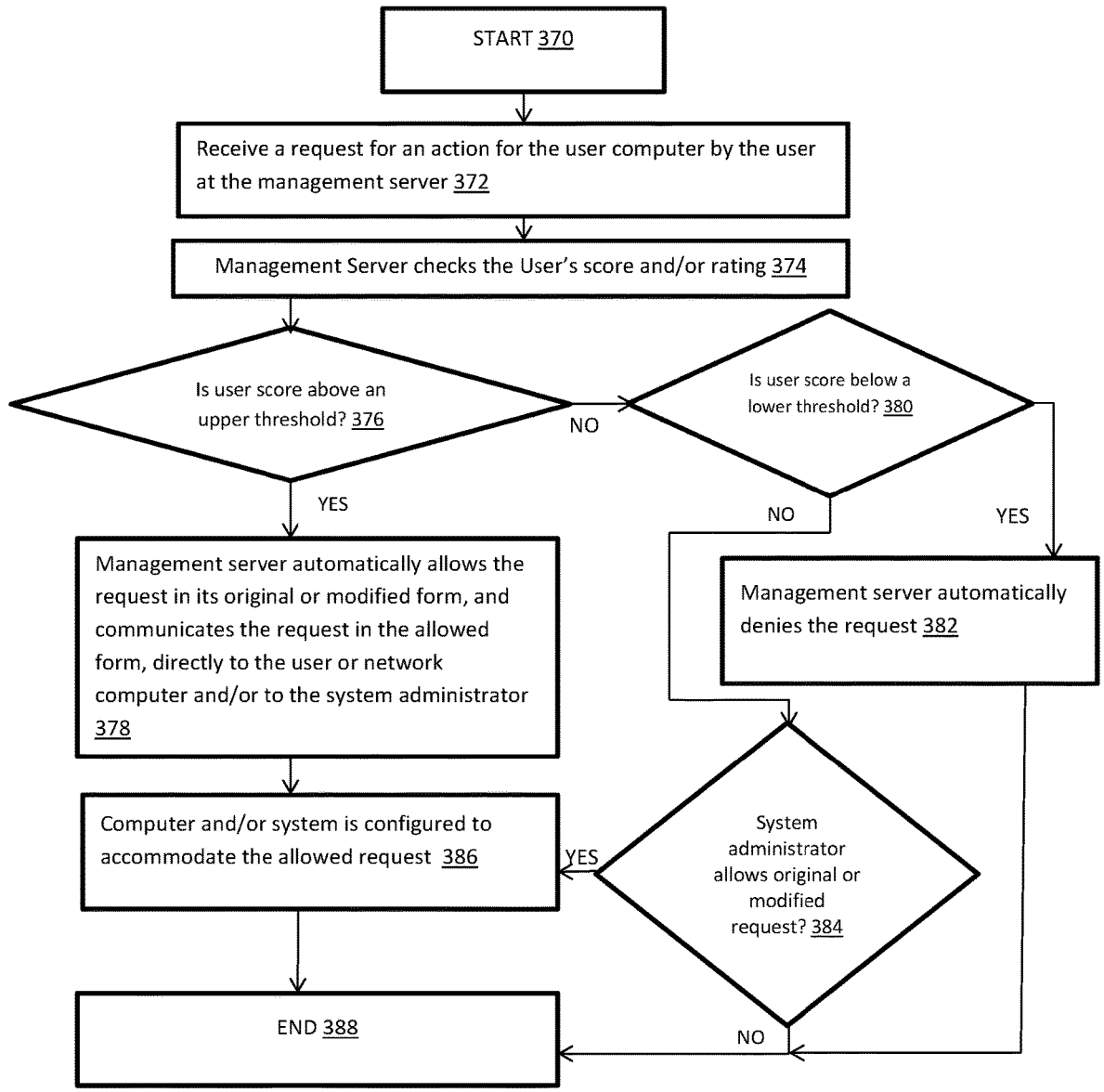

Attention is now directed to FIG. 3A, FIG. 3B, and FIG. 3C, which show flow diagrams detailing computer-implemented processes and sub-processes in accordance with embodiments of the disclosed subject matter. These processes, for example, are performed by a computer system, such as the computer system 100' of FIG. 2. The aforementioned processes and sub-processes are, for example, performed automatically and in real time.

The process begins at the START block 300, where, for example, a user is seeking to access a random browsing web site. Moving to block 302, a score (e.g., a behavior score) and/or ranking is assigned to the user by the system 100', e.g., data analysis scoring/ranking module 212, from data collected from the agent 115 at the endpoint, e.g., computer 110, of the respective user 110a-110n, and his computer behavior, known as user behavior.

The user behavior includes web browsing activity, attempts and continued attempts to access web sites blocked by the organization, email opens and open attempts, email attachment opens and open attempts, web site requests for browser direction, devices used by or associated with the computer, such as portable storage devices, WIFI™ and Bluetooth™ devices, and the like, responses to simulated threats, e.g., simulated cyber-attacks and simulated phishing attempts, simulated emails, any training and/or education as to company policy/cyber security, the user's position in the company, any permissions or credentials the user has, the accuracy and/or credibility of reports the user makes, the frequency of reports made by the user, any reports about the user, or behaviors of the user, from inside or outside the enterprise network 50, the time the user is typically active on his computer, and the like.

The assigned score will allow the system 100' to determine future actions or permissions and/or issue user behavior recommendations, which are provided to the user 110a-110n.

Moving to block 304, user activity is monitored by the agent 115 and by collecting events from SIEM and Active Directory systems and cybersecurity awareness training system, as well as data from an external server regarding sector/position/department/seniority/country/language/sociological status and so on (averages updated on external server), with captured data sent to the data collection module 211a, for analysis.

At block 306, the collected data is analyzed to determine whether the user's browsing activity, as well as other user behavior, has made the user a security risk, in browsing to the web site. This collected data includes user awareness data. For example, user awareness data includes a user having viewed a tutorial about cyber security (theoretical behavior/knowledge or user knowledge level), but continues to attempt to open a blocked attachment to an email, attempts to open an email which is from an unknown source, attempts to download a file from a web site, where the web site and/or the file type are against company policy, and the user continues to do so after multiple failed attempts, has a suspicious file attachment, or the like (the user's actual behavior/knowledge). Also, this user, who viewed the tutorial, may not have permission to access a particular file in the network, but repeatedly tries to do so. Also at block 306, group behavior may be taken into the analysis, for example, at a first time, user behavior, such as browsing to a certain web site may have been permitted, but now at a time later than the first time, after a group of system 100' users has reported the web site, the user's browsing to that web site may no longer be permitted by the system 100', and may be considered a security risk.

The process moves to block 308, where the user's position in the company, the type of the user, and/or the department in the company of the user, may be taken into consideration.

From block 308, the process moves to block 310, where the system 100', for example, via the management server 100, automatically determines whether action should be taken against the user computer. The action may also be determined through events in the Active Directory and SIEM that are reported to the cloud server 135. If no, or not at the present time, the process moves to block 314. If yes, at block 310, the process moves to block 312. At block 312, the system 100', for example, via the management server 100, automatically takes action, and/or sends a command to the agent 115, computer (endpoint), firewall, switch, router, network access controller router, or other peripheral component associated with the user computer 110, to take an action. This action may include, for example, blocking the email or web site the user's computer is seeking or attempting to access, block the user computer from the LAN 50, or the like.

From block 312, and also from block 310, the process moves to block 314, where the behavior recommendation engine 230 determines whether a behavioral recommendation should be issued to the user, via the user computer 110. The engine 230 analyzes all of the user behavior data and other user data at any given time, and recommends whether the user should be warned about his computer behavior, and directed to, or sent, for example, media, such as tutorials and education, including webinars (live and recorded), as provided by module 215 and/or a third party server 114a-114n. If yes, at block 314, the behavior recommendation engine 230 issues the behavior recommendation, and the system 100', for example, via the management server, automatically sends the recommendation to the various system modules 211a-220, and the user (user computer 110), who receives the behavior recommendation engine 230 selected tutorials and/or educational materials, for viewing, interacting with, and the like by the user at his computer 110. With the behavior recommendation issued, the process returns to block 302, from where it resumes with the use's score/ranking assigned, for example to the user's trustworthiness/risk. Similarly, if no at block 314, the process also returns to block 302, from where it resumes with the user's score/ranking is assigned. The assigned score may be changed, for example, raised or lowered, or remain the same. The score/ranking may, for example be for a particular time or over a time period.

Event Example 1—Event of an Attempt of Password Creation, where Password is not Compliant

- A user attempts to create a new password, password is checked against company policies and found not comply with the organization's policies;
- An event is created and sent to the Active Directory;
- Active Directory detects the event action and logs an appropriate error log;
- Active Directory send the event error log to SIEM;
- The SIEM server receives a notification from the active directory regarding the error log event;
- The SIEM server sends an update of the event (including user & event details) to the SIEM data collection 211b component that is responsible for receiving and filtering human information security events that come from the SIEM;
- If the event is not on the list of events to be tracked—no record is kept;
- If the event is on the list of events to be tracked—it is transferred to the data collection 211a via an API.

Event Example 2: Sample Rules/Associated Actions:

- A user tried to connect an external storage device/5 points are deducted from the user's security score; user will need to view a tutorial on the subject and pass a test to show he understood the procedures; 5 points are restored to the user's security score upon successfully passing the test;
- A user tried to access restricted sites for 5 times (regardless if connection successful or not)/Internet access is blocked for that user until the user views a tutorial for Internet access security rules and successfully passes a test at the end of the tutorial; 5 points are deducted from the user's security score, and 3 points are restored if the user passes the test with a score of 90 or more (out of 100);
- A user whose Internet Access score is 80 or above, may request access to a forbidden site/access may be granted for up to 2 hours;
- A user who failed the email phishing simulation for more than 3 times in a row or his phishing score is under 30/user will be blocked from sending/receiving emails until the user views a phishing tutorial and successfully passes a test at the end of the viewing; 10 points are deducted from the user's score.
- If A user receives a phishing simulation via email/SMS/WEB/Wi-Fi/or voice, where the phishing simulation includes a form-type landing page that entices the user to enter confidential information such as username, password or any personal network access details, then the system automatically makes a setting in the active directory (or in the agent at the user's end-device) that requires the user to change the password the next time he logs in to the network.
- An employee who downloaded an application on his smartphone from a website that is not an authorized store (like "Google Play™/App Store™") and was blocked by corporate MDM (Mobile Device Management) or an event log was received from another smart phone information security system)—the user will be deducted 8 points from his average score in the subject of mobile phones.
- An employee who has not been active on his computer for more than 20 minutes and has not locked his personal computer in accordance with the organizational policy in this regard, but rather an automatic locking has taken place through Active Directory (GPO/Group Policy Object) or another means—after 5 events of this type have occurred, then the locking time of his computer will be shortened to 8 minutes automatically and his average score on the subject of a clean table—will decrease by 10 points.
- An employee who tries to run an EXE file on his end-device, contrary to the organization's security policy—his access to the network will be blocked, 10 points will be deducted from his average score and access to the network will be granted only after a telephone conversation with the organization's support center.
- A new employee who wants to log in to the organization's network will receive privileges according to his position/departmental affiliation/group/"member of" affiliation, automatically—only after the user completes a tutorial on GDPR policies.
- After the central cloud server has received a huge amount of events and data from a variety of organizations in the world, according to which the machine learning model concludes that a male employee over the age of 50 in the finance department of an organization in the industrial sector is at a 90% risk of being attacked by email phishing—therefore, upon such a profiled user starting his work in this industrial organization, the profiled user will have to undertake a tutorial about "e-mail phishing".

FIG. 3B is a flow diagram of another exemplary process in accordance with another embodiment of the disclosed subject matter. The process begins at the START block 350. At this time, the computer user may or may not have a score (e.g., trustworthiness/risk), also known as a behavior score, and/or security rating, assigned to the user, whose behavior is the subject of the process.

The process moves to block 352, where the user's theoretical knowledge and/or behavior or user knowledge level, as to network and computer security, and the like, is determined. This determination is made by knowing that the user has viewed, interacted with, or otherwise consumed, various media, typically provided to the user by the system 100', such as tutorials and/or educational materials, presentations, and network based training, such as live or recorded webinars, and has communicated, typically by electronic communication, his completed consumption of this media (e.g., materials and presentations) to the system 100'. For example, one or more educational materials, tutorials, network based training, such as live or recorded webinars, and the like, such as videos, quizzes, interactive documents, is provided to the computer user, who indicates having completed these educational materials, tutorials and the like, to the system 100'. For example, the user may be provided with a time period in which to consume the media, such as educational materials, tutorials and the like, and indicate his completion of this media to the system 100'.

The process moves to block 354, where the practical behavior/practical knowledge of the user is determined. The system 100' has selected and sent one or more simulated security activities or other simulated computer activities, to the computer of the user, who has received and completed the educational materials, and has recorded the user's actions (behavior) in response to the one or more simulated security and/or simulated computer activities. These simulated security activities and/or simulated computer activities may be, for example, simulated emails, simulated downloads, simulated phishing communications, simulated cyberattacks, and the like, where the user's actions in response to these simulations are recorded, and presented to the system 100' as data for analysis.

The process moves to block 356, as the actual behavior and/or knowledge of the user is determined. For example, this is done by the system 100' doing one or more of recording computer activity, for example, obtained from the agent 115, as detailed above, and computer actions made by the user, during computer activity in daily computer operation, email sending and handling, web browsing, reviewing reports on the user, and the like.

The process moves to block 358, where an analysis of the user behavior and/or knowledge is performed, for example by the components 211a-220 and 230 of the system 100', for example, associated with the management server 100. The analysis, for example, is based on the theoretical behavior and/or knowledge (knowledge level) of the user, which includes, for example, knowing what materials (media) and the content of the materials that were consumed by the user, the practical behavior and/or practical knowledge of the user, for example, how was the user's computer behavior in handling system 100' generated simulations, and, the actual user computer behavior and/or actual knowledge, and/or additional factors such as reports, group behaviors, information about the user, company (enterprise) rules and policies, and the like, to determine a Score (trustworthiness/security risk) and/or rating (Security Rating) for the user.

Actual computer behavior of a user includes, for example, user actions and interactions to show the user interacts and behaves on a daily basis and/or over a time period, email behavior, web browsing behavior and the like, for example, in the form of data, such as data of user actions, for example, for analysis by the system 100' and its components 211a-220 and 230. These user actions, include interactions between the user computer and various computers, components, network components, servers, and the like includes, for example, web sites (browser directions to URLs) that are viewed, and which web sites at what time, what time is the computer normally used, external devices and/or drives, such as disk on keys, and the like, connected to the computer, any reports made by or about the user, including for example, reports made by the user which are accurate and credible which may positively influence the user's score, does the user report certain web sites, or others viewing certain web sites, at what time and with what frequency, does the user request permission to browse web sites against company policy or unauthorized or suspicious web sites, when, does the user request exceptions to company computer policies, does the user continue to attempt, and/or continue multiple times (for example, beyond a system permitted number of times) to attempt, to open unopenable files, such as email attachments, or files not permitted to be opened by company policies, such as certain file types, or other files from external sources such as web sites (regardless whether the web sites and/or files are benign) against company policy, or failing to take protective action against external files (e.g., virus scanning and/or reporting these files as suspicious), downloads made and downloads attempted, terminating the LAN and/or WAN connection when leaving the computer 110, changes of file types/extensions, the user's position in the company, any permissions or credentials, including temporary permissions or credentials, of the user, sudden or irregular behavior on the computer by the user, abnormal computer behavior, such as slowdowns, longer than normal times for the computer to boot, and the like. The system administrator 102 may also provide a list or one or more additional user actions, behaviors or criteria from reports made by or about the user, which are considered dangerous and affect the user's score, for example, to the analysis module 212.

The score (e.g., behavior score) and/or rating for the user may change at this point, or remain the same, provided a score and/or rating was present at the START block 250.

Based on the score and/or rating of the user, at block 360, the system 100', for example, via the behavior recommendation engine 230, determines whether action should be taken against the user computer, issue a behavioral recommendation for the user, and/or do nothing at this time. The taking action is in accordance with that described above, and is performed, for example, to mitigate threats, including malware, spyware, and damaging agents, and the like. The behavioral recommendation is in accordance with that described above, and includes, for example, providing the user with media, such as educational materials and tutorials, including, for example, the management server 100 automatically sending the user educational materials, tutorials, quizzes, warnings, network-based training, live or recorded, to understand computer security, computer safety, company computer rules and policies, and the like.

The process moves to block 362 where it ends. At this block, the user score and/or rating is updated, and stored in the system 100', and should a process for the user start again, carries over to the START block 350. The process may be repeated, for example, from the START block 350, for as long as desired.

FIG. 3C is a flow diagram of another exemplary process in accordance with another embodiment of the disclosed subject matter. The process begins at the START block 370. At this time, the computer user subject to the process has a score (behavior score) (e.g., trustworthiness/risk) and/or security rating, assigned to him. For example, the score is determined by processes, such as those detailed in one or more of blocks 352, 354, 356 and 358 of FIG. 3B. The process moves to block 372, where the user makes a request to the management server 100, and the management server 100 receives the request. For example, the request may be to use a disk on key and access the website www.example.sportsscores.com, a gambling web site prohibited by company policy, but is known to be benign from various reports received by the management server 100, or from an existing web filtering solution in the organization (enterprise).

The process moves to block 374, where the management server 100 automatically checks the user's score from the data analysis module 212. If the user's score is above a predetermined upper threshold, at block 376, the process moves to block 378. At block 378 the management server 100 automatically allows the request, either as requested, or modifies the request, for example, allows the disk on key, but not access to the web site www.example.sportsscores.com, and, for example, for a limited time period, such as one hour. For example, if the user has a very high score, the disk on key and access to www.example.sportscores.com may be allowed, such as for one day.

Returning to block 376, if the user's score is below the predetermined upper threshold, the process moves to block 380. At block 380, if the user's score is below the lower threshold, the process moves to block 382, where the management server 100 automatically denies the user's request. From block 382, the process moves to block 388, where it ends.

If "no" at block 380, the process moves to block 384, where the management server 100 automatically passes the score and the responsibility for the decision to allow (including modify) or deny the user's request to the system administrator 102. Should the system administrator 102 deny the request, at block 384, the process moves to block 388, where it ends.

From block 378, and if "yes" at block 384, the process moves to block 386. At block 386, the original or modified request, the one which has been allowed, is acted on by the management server 100 (from block 378), which automatically directly configures the computer and/or the various network components responsible for the allowed actions, or automatically sends a command or signals to the system administrator 102, to make the aforementioned computer and network configurations. Alternately, if from block 384, the system administrator 102 makes the aforementioned computer and network configurations to accommodate the allowed request, or sends a recommendation for actions to other technological information security solutions that exist in the organization (enterprise).

From block 386, the process moves to block 388, where the process ends. Here, the user's score and/or rating may be changed. The process may be performed again for as long as desired.

The following examples show various aspects of the behavior recommendation engine 230 analyzing various user activity and user data to provide a recommendation to the user, and/or cause the system 100', for example, via the management server 100, to take action, such as issue a behavioral recommendation including a warning and/or tutorials and other education, and/or send a command from the engine 230 to cause the system 100', for example, via the management server 100, to issue a behavioral recommendation including a warning and/or media, such as tutorials and other educational documents, presentations, and the like, and/or take action. The taking action is, for example, for the purpose of mitigating threats such as malware, viruses and other threats, which could harm the user's computer, company network and its computers, and the like.

EXAMPLE 1—A user who works every day from 8 am to 8 pm is suddenly showing activity on his computer as being active at 11 pm. The behavioral recommendation engine 230 analyzes this change in time of activity and recommends that action be taken by the system 100', for example, via the management server 100. The action recommended and taken is one of blocking the user computer from accessing the network 50, alerting before blocking, or asking for a certain code to make sure it is the user (similar to a two factor authentication).

EXAMPLE 2—The behavioral recommendation engine 230 analyzes a combination of awareness, rating, ongoing behavior, detection of exceptions and automated actions. Here, the user has never tried to download software and has a high cybersecurity awareness training and behavior rating, but is now suddenly trying to download software from a website, which is unacceptable under the organization's policies. The recommendation is to take action by automatically blocking the user computer from accessing the network 50, and automatically reporting to the system administrator 102 (by email) of the blocking. The recommendation engine 230 can also send commands to the requisite network components and computers to take the recommended action.

EXAMPLE 3—A user who has never attempted to browse malicious websites, and now suddenly tries to browse websites not previously visited, or a user who suddenly tries to transmit information to third parties, both users having a very high cybersecurity awareness training and behavior rating, the engine 230 recommends automatic action in the form of blocking the user computers from the network 50 and/or alerting the system administrator. The recommendation engine 230 can also send commands to the requisite network components and computers to take the recommended action.

EXAMPLES 2 and 3 illustrate how to combine an action that happened on a computer, which is in violation of an organization's policy, with a user's level/rating of his cybersecurity awareness training and behavior. The behavior recommendation engine 230 recommends automatic behavioral recommendations and/or actions to block the user computers from accessing the network 50.

EXAMPLE 4—A user wants to use a disk on key to download/upload some documents. Disk on keys are against the enterprise's security policy and the user knows this, hence, he is requesting permission from the management server 100. Since the user has a high score, he is considered trustworthy, and accordingly, the system administrator 102 grants the user permission for one hour to use this disk on key, and the management server 100 automatically configures the user's computer (endpoint) accordingly, or automatically sends instructions to the system administrator 102 to do so.

EXAMPLE 5—A user wants to browse a web site against the enterprise's security policy (regardless of whether the web site is benign) and the user knows this, hence, he is requesting permission from the management server 100. As the user's score is high, the user is considered to be trustworthy, and the management server 100 automatically unblocks the web site for a limited time, such as an hour, whereby the user may access this web site, or alternately sends instructions to the system administrator 102 to do so. Alternately, the management server 100 may automatically send a recommendation for actions to other technological information security solutions that exist in the organization.

EXAMPLE 6—Once an action is performed at the end point computer 110, that is in violation of company (enterprise) policy, or an employee fails in a simulation—the system 100', for example, of the management server 100, via the behavior recommendation engine 230, will automatically send the employee a quiz/tutorial according to the action taken. For example—after the employee has browsed the Internet more than 10 times for websites that must not be browsed (and blocked)—the engine 230, via the management server 100, automatically sends a command to the requisite computer or network device to block this endpoint computer 110 from accessing the Internet will be blocked. Additionally, the engine 230 may automatically send a command to the tutorials and education module 215, to send the user a tutorial on cybersecurity and enterprise policy, which the user will need to successfully pass. Only then be able to continue surfing the Internet.

EXAMPLE 7—At a first time t1, a user with a low score reports a web site as suspicious, to the system 100'. At subsequent second, third and fourth times, t2, t3, t4, users with high scores report this web site as suspicious to the system 100'. As of time t4, company network users may still access this web site. At a subsequent fifth, sixth and seventh time, t5, t6 and t7, high score users report this web site as suspicious to the system 100'. Now, at an eighth time t8, after time t7, the system 100', for example, via the management server 100, automatically blocks all access to this web site for all computers on the company network, regardless of the user's score, as a minimum number of high score users have reported this web site as suspicious. Alternately, the management server 100 automatically allows high score users to access this web site, while low score users are blocked from accessing this web site. The management server 100 can send one or more notifications to the cloud server 135. The cloud server 135 can then, for example, send these notifications to other management servers for their enterprise networks.

EXAMPLE 8—Data Leak Protection (DLP). A user is sending credit card numbers/credit card information over the network 50. Sending credit card numbers, and using credit card processing electronic forms, is against company policy. This user behavior is monitored, for example, the activity in violation of the company (enterprise) policy is monitored by a DLP solution (if there is one in the organization (enterprise)) and the DLP is the one that reports to the management server 100 the user's attempt to send data in violation of the policy. This behavior of the user affects his score, and is automatically reported, for example, as a report to the analysis module 212 and the behavior recommendation engine 230. The management server 100 acts automatically, such that the analysis module adjusts the user's score, for example, negatively, and/or causes the computer 110 of the user and/or the gateway 130 to block this email or other transmission of credit card numbers/information (the automatic taking of action).

The processes of EXAMPLES 1-8 may be performed automatically by the system 100', of the management server 100, or by manual operation, according to the system administrator 102 settings, or combinations thereof. This includes sending instructions for action from the management 100 server for technological solutions possessed by the organization (enterprise).

In other embodiments, the cloud server 135 links to the management server 100, and, for example transmits reports as to malicious or suspicious web pages, for every predetermined number of instances the web page is determined to be suspicious or malicious. The system 100' now has this information and can analyze user behavior knowing that a web site is suspicious or malicious. This information can also be shared with the system administrator 102, and with a relevant technological solution that exists in the organization, either from the cloud server 135 or the management server 100, which can take action accordingly.

Embodiments of the disclosed subject matter are directed to a method for providing an automated response to user behavior, for example, for user computer behavior management. The method comprises: receiving, by a computer system, data of user actions taken on a computer of the user, the computer of the user in communication with the computer system; analyzing the received data against the knowledge level of the user as determined by the computer system, and/or, the user's responses to simulations generated by the computer system, to determine a score for the user; and, in response to the score, making a behavior recommendation for the user and/or making a decision to take an action associated with the computer of the user.

Optionally, the method additionally comprises providing an agent to the computer of the user for obtaining the user actions taken on the computer of the user and transmitting data of the user actions to the computer system. Optionally, the agent monitors the computer of the user to obtain the user actions taken on the computer of the user. Optionally, the knowledge level of the user is determined by the computer system, based on the user having been provided media about the computer and/or the computer system, by the computer system. Optionally, the knowledge level of the user is additionally determined by the computer system receiving indications of interaction by the user with the provided media, from the user of the computer. Optionally, the media includes materials in electronic formats. Optionally, the computer system automatically generates electronic reports on the user of the computer, and, the analyzing additionally includes analyzing one or more of the electronic reports on the user of the computer. Optionally, the simulations generated by the computer system include one or more of: cyber-attacks, phishing, email handling, document handling, file handling, and web browsing. Optionally, the making a behavior recommendation for the user and/or a decision to take an action on the computer of the user, includes not making a behavior recommendation for the user and/or not making a decision to take an action on the computer of the user. Optionally, the behavior recommendation includes transmitting, to the computer of the user, a warning to the user of the computer, and/or sending materials to the computer of the user, associated with the behavior of the user on the computer of the user. Optionally, the decision to take action on the computer of the user, includes causing an action to be taken by the computer of the user and/or the computer system. Optionally, the computer system includes at least one computer comprising at least one processor and a memory.

Optionally, the method is such that it additionally comprises, receiving a request from a user of the computer. Optionally, the making a decision to take an action on the computer of the user includes allowing or not allowing the request. Optionally, the allowing the request includes causing the computer of the user to operate in accordance with the request.

Embodiments of the disclosed subject matter are directed to a system for managing computer behavior of users. The system comprises: a storage medium for storing computer components; and, at least one processor for executing the computer components. The computer components comprise: a first module for receiving data of user actions taken on a computer of the user, the computer of the user in communication with a computer system; a second module for analyzing the received data of user actions against a knowledge level of the user, and/or, the user's responses to simulations generated by the computer system, to determine a score for the user; and, a third module, which responds to the determined score to make a behavior recommendation for the user and/or make a decision to take an action associated with the computer of the user.

Optionally, the system additionally comprises: an agent associated with the computer of the user for transmitting the data of user actions to the first module. Optionally, the agent is configured to monitor the computer of the user to obtain the user actions taken on the computer of the user. Optionally, the system additionally comprises a fourth module for determining the knowledge level of the user, based on media provided to the user. Optionally, the system additionally comprises a fifth module for providing simulations to the computer of the user, the simulations including one or more of: cyber-attacks, phishing, email handling, document handling, file handling, and web browsing. Optionally, the behavior recommendation for the user and/or a decision to take an action on the computer of the user, by the third module includes not making a behavior recommendation for the user and/or not making a decision to take an action on the computer of the user. Optionally, the system additionally comprises a sixth module for handling requests from users of computers, and based on a score associated with the user who made the request, rendering a decision to allow, modify or deny the request.

Embodiments of the disclosed subject matter are directed to a computer usable non-transitory storage medium having a computer program embodied thereon for causing a suitably programmed system to manage computer behavior of users, by performing the following steps when such program is executed on the system. The steps comprise: receiving data of user actions taken on a computer of the user, the computer of the user in communication with a computer system; analyzing the received data of user actions against a knowledge level of the user, and/or, the user's responses to simulations generated by the computer system, to determine a score for the user; and, responding to the determined score to make a behavior recommendation for the user and/or make a decision to take an action associated with the computer of the user.

Optionally, the computer usable non-transitory storage medium additionally comprises: determining the knowledge level of the user, based on media provided to the user of the computer. Optionally, the computer usable non-transitory storage medium additionally comprises: providing simulations to the computer of the user, the simulations including one or more of: cyber-attacks, phishing, email handling, document handling, file handling, and web browsing. Optionally, the behavior recommendation for the user and/or a decision to take an action on the computer of the user, includes not making a behavior recommendation for the user and/or not making a decision to take an action on the computer of the user. Optionally, the computer usable non-transitory storage medium additionally comprises: handling requests from users of computers, and based on a score associated with the user who made the request, rendering a decision to allow, modify or deny the request.

According to actual instrumentation and equipment of embodiments of the method and/or system of the disclosed subject matter, several selected tasks could be implemented by hardware, by software or by firmware or by a combination thereof using an operating system or a cloud-based platform.

For example, hardware for performing selected tasks according to embodiments of the invention could be implemented as a chip or a circuit, or a virtual machine or virtual hardware. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The present invention also relates to systems and methods for predicting security risks and recommending appropriate preventive actions. In some embodiments, the system 100 can receive a large amount of security events both from inside the organization and from other similar systems 100. Data from other systems 100 may be filtered or aggregated so that personal identity information is not shared among systems. The events may be also analyzed by a human specialist in order to score and categorize them. The security events are then analyzed using machine learning methodologies, in order to build a security threat model based on current and future data received. According to the specific user fields tracked, such as user demographics, profile, job related data etc., the system is able to use the data to predict which users or groups of users are in a higher risk of violating security policies or falling victims to malicious attacks.

For example, the model may predict based on existing data, that employees at a certain department or job function, over a certain age may be at a higher risk for not noticing a phishing email. The system can then recommend specific actions for users with high-risk profiles, such as additional training, closer monitoring by management, additional supportive tools etc.

The system can also track the effectiveness of the different tutorials and helping tools for different users. The model can identify the effectiveness of different tutorials on different user profiles. For example, the model may conclude that for users under 30 or of a given educational background a video tutorial of 10 minutes is sufficient, while for users over 50 a lecture from an IT expert is more effective.

When a new employee joins the company, the model can recommend the appropriate tutorials (types, frequency) for that user based on the user profile.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A computing system comprising:
   at least one processor; and
   at least one memory communicatively coupled to the at least one processor comprising computer-readable instructions that when executed by the at least one processor cause the computing system to implement a method of predicting a security risk by a user, the method comprising:
   (i) receiving by the system a plurality of security policy rules, each rule comprising a condition indicative of a security violation and a corresponding remedial action to be applied to a user violating said condition;

(ii) receiving by the system a plurality of security events, each event comprising user profile data and event-related data;

(iii) applying a machine learning model trained on the user security events data to generate, for each user, a user specific profile associating that user with one or more risk probability for violating a security policy rule;

(iv) receiving a user profile and a security policy rule and based on the model determining a risk probability that the user will violate said security policy rule; and (v) if said risk probability is above a predetermined value, recommending taking a preventive action with the user.

2. The computing system of claim 1, wherein in step (iv) the system receives a category of users.

3. The computing system of claim 1, additionally comprising: providing a software agent to the computer of the user for obtaining the user actions taken on the computer of the user and transmitting data of the user actions to the computer system.

4. The computing system of claim 1, wherein a security event is reported by said agent based on user actions.

5. The computing system of claim 4, a security event is based on user actions during a simulation presented to him by the system.

6. The computing system of claim 5, wherein the simulations generated by the system include one or more of: cyber-attacks, phishing, SMS phishing, voice phishing, Wi-Fi phishing, media devices hacking, email handling, document handling, file handling, and web browsing.

7. The computing system of claim 1, wherein each user has one or more security scores based on his profile, history of security compliance, and successful trainings results.

8. The computing system of claim 1, wherein said action associated with the user comprises preventive user training, sending a warning to the user, alerting the user's manager, and activating preventive security tools, in order to reduce the security risk associated with said security policy rule.

9. A computing system comprising:
at least one processor; and
at least one memory communicatively coupled to the at least one processor comprising computer-readable instructions that when executed by the at least one processor cause the computing system to implement a method of responding to a security risk by user in an organization, the method comprising:

(i) receiving by the system a plurality of security policy rules, each rule comprising a condition indicative of a security violation and a corresponding remedial action to be applied to a user violating said condition;

(ii) receiving by the system from a computerized security agent surveying the user's actions, a security event associated with a user in said organization; and (iii) verifying if said security event violates a security policy rule, and if so, applying the action associated with said security policy rule towards said user, said associated comprising one or more of: changing the user's access privileges in the organization's system, adjusting the user security score, and mandating the use to undertake instructional measures to strengthen the user's knowledge of the security rules.

10. The computing system of claim 9, a security event is based on user actions during a simulation presented to him by the system.

11. The computing system of claim 10, wherein the simulations generated by the system include one or more of: cyber-attacks, phishing, SMS phishing, voice phishing, Wi-Fi phishing, media devices hacking, email handling, document handling, file handling, and web browsing.

12. The computing system of claim 9, wherein each user has one or more security scores based on his profile, history of security compliance, and successful trainings results.

13. The computing system of claim 9, wherein said action associated with the user further comprises preventive user training, sending a warning to the user, alerting the user's manager, and activating preventive security tools, in order to reduce the security risk associated with said security policy rule.

14. The computing system of claim 9, wherein the security event is one or more of: Security Information and Event Management (SIEM) server, Active Directory (AD) or through an application programming interface (API) on the network.

* * * * *